J. PITTMAN.
AUTOMATIC DISCHARGE VALVE.
APPLICATION FILED DEC. 11, 1920.

1,416,869.

Patented May 23, 1922.

JOSEPH PITTMAN.
INVENTOR

BY Victor J. Evans
ATTORNEY

UNITED STATES PATENT OFFICE.

JOSEPH PITTMAN, OF DETROIT, MICHIGAN.

AUTOMATIC DISCHARGE VALVE.

1,416,869.

Specification of Letters Patent. Patented May 23, 1922.

Application filed December 11, 1920. Serial No. 429,992.

*To all whom it may concern:*

Be it known that I, JOSEPH PITTMAN, a citizen of the United States, residing at Detroit, in the county of Wayne and State of Michigan, have invented new and useful Improvements in Automatic Discharge Valves, of which the following is a specification.

This invention relates to an automatic discharge valve for compressed air retainers, and an object of the invention is to provide a valve structure which will automatically operate to permit the draining of condensation or liquid from an air reservoir or tank, without permitting the escape of the compressed air.

More specifically, the invention comprehends the providing of a valve as specified, which embodies a float controlled valve piston, operable upon accumulation of a predetermined quantity of water within the valve casing to open the valve structure to permit the water to flow therefrom, and which valve structure automatically closes, under gravity action of the valve piston and float, as the quantity of water recedes in the casing of the valve.

Other objects of the invention will appear in the following description taken in connection with the accompanying drawings wherein.

Figure 1:
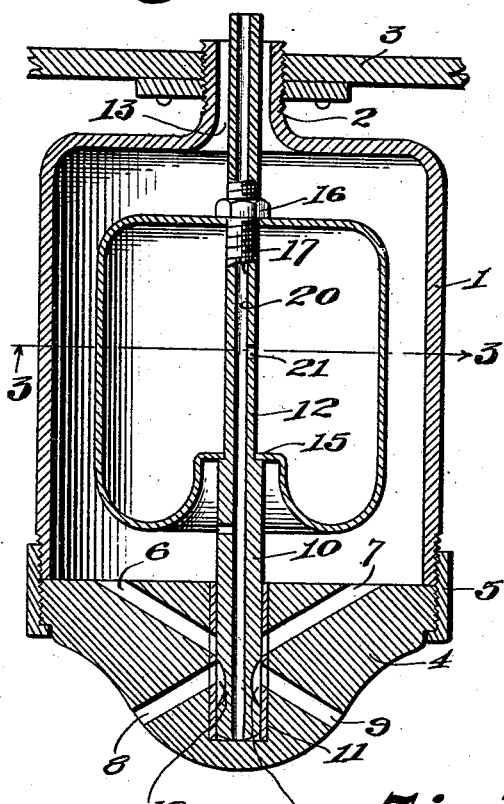
Fig. 1 is a longitudinal section through the valve showing it closed.
Figure 2:
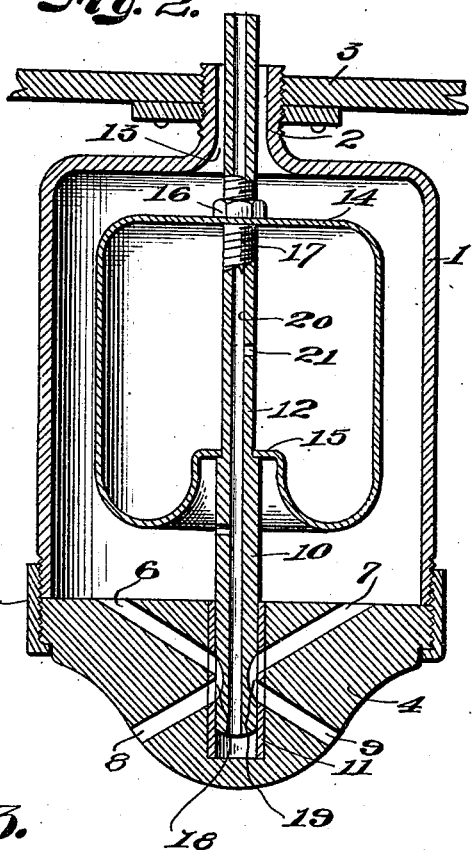
Fig. 2 is a longitudinal section through the valve showing it open.
Figure 3:
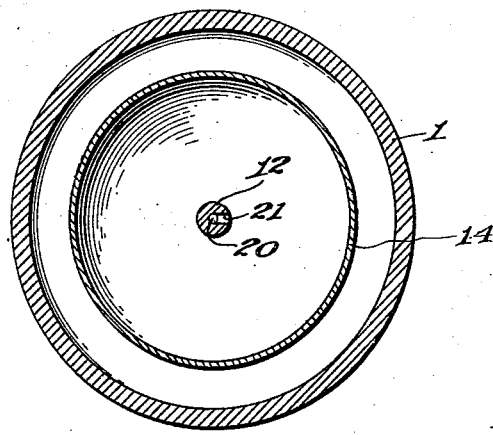
Fig. 3 is a cross section through the valve taken on lines 3—3 of Fig. 1.

Referring more particularly to the drawing, the improved automatic discharge valve comprises a casing 1 having an axially threaded stem 2 upon its upper end, which is adapted to be threaded into a compressed air reservoir or tank, as indicated at 3. The casing 1 has a valve block 4 connected to its lower end by a threaded collar 5, which threaded collar permits the removal of the valve block 4 for cleaning the passage ways therein. The block 4 is provided with a plurality of downwardly inclining passage ways 6, 7, 8 and 9, the latter two of which provide outlet or discharge ports for the valve structure, the passage way 8 being adapted to form the outlet for the passage way 6 while the passage way 9 forms the outlet or discharge for the passage way 7.

Communication between the passage ways 6, 7 and 8 and 9 respectively is normally cut off by the valve piston 10 which is slidably mounted in a suitable guide sleeve 11, mounted in the valve block 4. The piston 10 extends upwardly into the casing 1, and has a stem 12 formed thereon, which stem extends axially through the casing and through the casing stem 2 being smaller in diameter than the bore of the stem 2 to provide sufficient space as indicated at 13, about the valve stem 12, to permit condensation to drain from the tank 3 into the casing 1. A float 14 is mounted upon the valve stem 12, being recessed in its lower end and provided with a flat portion 15 which rests against the upper end of the piston 10 of the valve. A clamping nut 16 is mounted on the threaded portion 17 of the stem 12, and engages against the upper end of the float 14 for clamping the float against the upper end of the piston and prevent the relative movement of the float and piston.

The piston 10 is provided with cut-out portions 18 and 19 in its opposite sides, which are provided to permit communication between the passage ways 6 and 8 and 7 and 9 respectively, when sufficient condensation or liquid accumulates within the casing 1 to cause the float 14 to rise thus permitting the liquid or condensation to flow from the casing 1 through the passage ways 6 and 7, cut-out portions 18 and 19 into and through the discharge passage ways 8 and 9. As the quantity of liquid in the casing 1 decreases, the float 14 moves downwardly, under gravity action, and gradually lowers the piston 10, gradually cutting off the communication between the passage ways 6 and 8 and 7 and 9 until such communication is completely cut off and the float remains stationary until the quantity of liquid in the casing 1 increases sufficiently to cause it to rise.

The stem 12 and piston 10 are provided with longitudinally extending bore 20 with which bypasses 21 communicate to equalize the air pressure in all parts of the valve structure.

The improved automatic valve structure may be constructed in any size necessary to properly drain condensation from any size of type of compressed air tanks.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In an automatic discharge valve, a casing, a valve block detachably connected to the lower end of said casing and provided with diagonal discharge passage ways, a valve piston for controlling the discharge of condensation through said passage ways, a stem on said piston, a float on said stem for controlling the movement of the piston, and means for clamping said float against the upper end of said piston.

2. In an automatic discharge valve, a casing, a valve block detachably connected to the lower end of said casing and provided with diagonal discharge passage ways, a valve piston for controlling the discharge of condensation through said passage ways, a stem on said piston, a float on said stem for controlling the movement of the piston, and means for clamping said float against the upper end of said piston, said stem and piston provided with longitudinally extending bores and lateral bypasses to permit the equalization of air pressure in all parts of the valve.

3. In an automatic discharge valve, a casing adapted to receive condensation therein, a valve block detachably connected to the lower end of said casing and provided with diagonally extending outlet and discharge passage ways, a valve piston slidable in said block and provided with longitudinally extending cut-out portions adapted to provide communication between said outlet and discharge passage ways to permit the draining of condensation from said valve casing, a valve stem on said piston, and a float carried by said stem.

4. In an automatic discharge valve, a casing adapted to receive condensation therein, a valve block detachably connected to the lower end of said casing and provided with diagonally extending outlet and discharge passage ways, a valve piston slidable in said block and provided with longitudinally extending cut-out portions adapted to provide communication between said outlet and discharge passage ways to permit the draining of condensation from said valve casing, a valve stem on said piston, and a float carried by said stem, said stem and piston provided with a longitudinally extending bore and bypasses to equalize air pressure in all parts of the discharge valve.

In testimony whereof I affix my signature.

JOSEPH PITTMAN.